United States Patent
Pieber et al.

(10) Patent No.: US 9,949,528 B2
(45) Date of Patent: Apr. 24, 2018

(54) BOOT WITH AN ELEMENT IN SHELL FORM

(75) Inventors: Alois Pieber, Hohenzell (AT); Franz Resch, Schladming (AT)

(73) Assignee: Fischer Sports GmbH, Ried/Innkreis (AT)

( * ) Notice: Subject to any disclaimer, the term of this patent is extended or adjusted under 35 U.S.C. 154(b) by 854 days.

(21) Appl. No.: 13/978,651

(22) PCT Filed: Jan. 5, 2012

(86) PCT No.: PCT/AT2012/000003
§ 371 (c)(1),
(2), (4) Date: Jul. 8, 2013

(87) PCT Pub. No.: WO2012/092638
PCT Pub. Date: Jul. 12, 2012

(65) Prior Publication Data
US 2013/0283642 A1 Oct. 31, 2013

(30) Foreign Application Priority Data

Jan. 7, 2011 (AT) .................... A 23/2011

(51) Int. Cl.
| | | |
|---|---|---|
| *A43B 5/04* | (2006.01) | |
| *B29C 51/00* | (2006.01) | |
| *B29C 45/00* | (2006.01) | |
| *B29K 96/00* | (2006.01) | |
| *C08L 77/02* | (2006.01) | |
| *B29L 31/50* | (2006.01) | |
| *C08L 23/08* | (2006.01) | |
| *B29K 77/00* | (2006.01) | |

(52) U.S. Cl.
CPC ............ *A43B 5/0411* (2013.01); *A43B 5/04* (2013.01); *A43B 5/0486* (2013.01); *B29C 45/0001* (2013.01); *B29C 51/00* (2013.01); *B29C 2791/002* (2013.01); *B29K 2077/00* (2013.01); *B29K 2096/005* (2013.01); *B29L 2031/501* (2013.01); *C08L 23/0876* (2013.01); *C08L 77/02* (2013.01)

(58) Field of Classification Search
CPC ....... A43B 5/04; A43B 5/0411; A43B 5/0486; B29C 45/0001; B29C 51/00; B29C 2791/002; B29K 2077/00; B29K 2096/005; B29L 2031/501; C08L 23/0876; C08L 77/02
See application file for complete search history.

(56) References Cited

U.S. PATENT DOCUMENTS

| | | | | |
|---|---|---|---|---|
| 3,988,842 | A * | 11/1976 | Rathmell | A43B 1/0018 36/117.9 |
| 4,690,981 | A * | 9/1987 | Statz | C08F 8/44 525/221 |
| 5,786,057 | A | 7/1998 | Lyden et al. | |
| 6,291,633 | B1 * | 9/2001 | Nakamura | C08L 77/06 524/397 |
| 6,756,443 | B2 * | 6/2004 | Feinberg | C08L 23/0876 525/191 |
| 2004/0235586 | A1 | 11/2004 | Chen | |
| 2005/0124741 | A1 | 6/2005 | Chen | |
| 2007/0078523 | A1 * | 4/2007 | Kholwadwala | A61F 2/60 623/36 |
| 2008/0000109 | A1 | 1/2008 | Challande | |
| 2012/0202940 | A1 * | 8/2012 | Hausmann | C08L 23/0876 524/514 |
| 2014/0336317 | A1 * | 11/2014 | Huang | C08L 77/00 524/227 |
| 2015/0230539 | A1 * | 8/2015 | Bello | A43B 5/04 36/115 |

* cited by examiner

*Primary Examiner* — Callie E Shosho
*Assistant Examiner* — John D Freeman
(74) *Attorney, Agent, or Firm* — Nixon & Vanderhye P.C.

(57) ABSTRACT

A ski boot with an element in shell form at least partially contains a plastic compound material. The compound material contains a mixture of caprolactam polyamide and ionomers, such that cations and anions of the ionomers form ion bonds. Elastic components of the compound material form a physical network that is soluble between 60° C. and 100° C., and therefore the element in shell form of the ski boot at least partially containing the compound material can undergo thermoforming below 100° C.

19 Claims, 2 Drawing Sheets

BOOT WITH AN ELEMENT IN SHELL FORM

BACKGROUND OF THE INVENTION

Field of the Invention

The present invention relates to a ski boot, particularly an alpine or cross-country ski boot having an element in shell form which at least partially consists of a plastics compound material, and to a method for production of such element.

Boots having at least one element in shell form, i.e. particularly ski boots for alpine skiing and cross-country ski boots, are well known; in the context of the present invention, an "element in shell form" means any element covering at least part of the foot or lower leg.

The material for such relatively rigid elements of such boots, which are usually produced by injection molding, is usually thermoplastic elastomers. In the past two decades, particularly two groups of material have evolved which are preferably used particularly for boots in the field of professional sports.

One group is thermoplastic polyurethanes, both based on polyester polyol and on polyether polyol. Such materials comprise rigid segments, which are made of isocyanates in the case of polyurethane, and soft components, which are usually made of polyester polyol or polyether polyol. Such materials basically have good cold elastic properties and may be produced to have various degrees of stiffness or rigidity; however, they have two particular disadvantages.

The first disadvantage is that they have a relatively poor rigidity temperature behavior in the range of +20° C. to −20° C., i.e. the temperature range in which boots for alpine and cross-country skiing are usually used. In other words, these materials usually stiffen by about 400% in this temperature range. Consequently, the user will have boots having very different rigidity depending on the temperature. This is particularly disadvantageous because the future user will usually try on the boots at a sports outfitter's shop where the room temperature is usually about 20° C. In the shop the boots feel comfortable and soft. Later, however, when the boots are used for skiing, which is usually done at a temperature below freezing, the boots will be clearly more rigid, and the user will often feel uncomfortable. The second disadvantage is that for such boots having elements in shell form made of injection molded polyurethane a temperature of >165° C. is needed to adapt the elements to the user's foot by means of thermoforming under vacuum or pressure. However, such temperatures are not acceptable for adapting the elements in shell form directly to the human foot. Moreover, such high temperatures result in oxidative molecular decomposition under the influence of air oxygen, i.e. the material properties such as rigidity and flexibility will change.

The second group of materials used for producing boot elements in shell form is polyamide elastomers, which are particularly known under the brand names Pebax or Vestamid. In such materials, the rigid segments are usually made of PA 11 (11-amino undecanoic acid) or PA 12 (laurin lactam or omega-amino decanoic acid). The soft segment is usually made of polyether. Compared to the thermoplastic polyurethanes mentioned above, polyamide elastomers have the advantage that their rigidity in the temperature range of +20° C. to −20° C. only changes by about 200%, compared to thermoplastic polyurethanes.

However, such polyamide materials have the disadvantage that they are not thermoformable in a temperature range of up to about 100° C., i.e. in a range acceptable to the human foot when using an inner boot between the foot or leg and the shell.

A boot partly made of a plastics compound material is e.g. described in US 2008/000109 A1. This document relates to a boot having elements in shell form made of polyurethane or polypropylene in a well-known manner with caprolactam based polymer admixtures in certain areas. In other words, this document discloses a polyurethane or polypropylene caprolactam compound material. This yields a shell being relatively rigid in some sections and having a softening temperature of >170° C., while in the areas made of said plastics compound material a softening temperature of below 100° C. is supposed to be achievable. However, the disadvantage of such a boot is that its production is rather complex and costly because the boot necessarily comprises different material zones.

US 2004/0235586 A1 teaches cast plastics parts such as e.g. heel or toe caps for shoes or boots, which parts are made of compound material comprising a mixture of thermoplastic elastomers, thermoplastic ionomers, thermoplastic polyurethane and duroplastic, organic fiber-modified polyurethane. This is supposed to particularly improve rigidity and abrasion resistance of the cast plastics parts.

Similarly, US 2005/056669 A1 teaches plastics parts e.g. for heel or toe caps or soles, which parts are made of a mixture of ionomeric copolymers and organic acids or salts thereof, yielding high rigidity and high resilience.

Further, US 2008/0000109 A1 discloses an alpine ski boot having a rigid shell made of plastics material having a softening temperature above 170° C. In addition, caprolactam polyamide is added to at least one section of the shell base material in order to reduce the softening temperature of the shell in this particular section to below 100° C.

BRIEF SUMMARY OF THE INVENTION

The aim of the present invention is to provide a ski boot, particularly an alpine or cross-country ski boot having at least one element in shell form made of compound material having satisfying rigidity properties in a temperature range between +20° C. and −20° C. and being thermoformable at a temperature of <100° C.; and to provide a process for producing such elements.

According to the present invention, this aim is reached in that said compound material comprises a mixture of caprolactam polyamide and ionomers, so that cations and anions of the ionomers form ion bonds, with the elastic components of the compound material forming a physical network that is disruptable between 60° C. and 100° C., so that the element in shell form of the ski boot that at least partly consists of said compound material is thermoformable below 100° C.

In other words, in the compound material according to the present invention, caprolactam polyamide is used as the base material or rigid segment, and ionomers are added to this base material as soft segments.

It is particularly advantageous for the ionomers to be copolymerisates of ethylene with carboxylic acid, particularly acrylic acid, including metal ions, particularly zinc or sodium. Cations and anions of the ionomers will form ion bonds, which has the advantage that the elastic components will form a physical network, which—depending on what ionomer is actually used—can usually be disrupted between 60° C. and 100° C. Therefore, the material will be excellently thermoformable, but after cooling, said ion bonds will form again and the original material properties will be restored. Advantageously, ionomers are highly elastic and have a rigidity temperature behavior similar in range to polyamide elastomers, i.e. their rigidity increases by about 200% in a temperature range from +20° C. to −20° C.

Depending on the desired rigidity of the compound material, the weight ratio of the ionomers advantageously is at least 20%, preferably between 25 and 70%. In order to improve workability of the compound material in injection molding processes, an organic and/or inorganic crystallization accelerating agent is conveniently admixed, preferably at a weight ratio of 0.1 to 1%. Such crystallization accelerating agents, also known as nucleating agents, are particularly advantageous if the element in shell form is produced having varying wall thicknesses, e.g. ranging from 2 mm to 20 mm, as is often the case with hard shells of alpine ski boots, and the boot element in shell form is removed from its forming tool while it is still hot. In this process, problems may occur if no nucleating agent is added because caprolactam polyamide and the ionomer component have different crystallization properties. It has proven particularly advantageous to admix talc and/or a low molecular polyamide as the crystallization accelerating agent; in this case, it is particularly advantageous to provide a mixture of organic and inorganic crystallization accelerating agents as the crystallization accelerating agent.

Consequently, for producing an element in shell form, preferably by injection molding, it is advantageous to essentially provide a mixture of 30 to 45% by weight of caprolactam polyamide, 0.1 to 1% by weight of crystallization accelerating agent, and the balance of essentially 55 to 70% by weight of ionomers.

In order to maintain the plastic properties of the compound material at an as constant level as possible over a wide temperature range, it has proven advantageous to admix a thermoplastic rubber, particularly ethylene propylene monomer rubber (EPM) or ethylene propylene diene monomer rubber (EPDM). In this case, it is particularly advantageous to have a weight ratio of thermoplastic rubber of essentially 10 to 30%.

In this case, it is particularly preferable to essentially provide a mixture of 30 to 45% by weight of caprolactam polyamide, 0.1 to 1% by weight of crystallization accelerating agent, 20 to 30% by weight of thermoplastic rubber, and the balance of essentially 25 to 35% by weight of ionomers.

The process of the above mentioned type is characterized in that ionomers are admixed to a caprolactam polyamide and this compound material is subsequently molded in an injection molding process. Thus, the compound material making up at least part of the element in shell form to be molded has the advantage of having relatively constant rigidity properties over the relevant temperature range and a relatively low softening temperature for thermoforming. In addition, it is particularly advantageous in that the compound material containing caprolactam polyamide and ionomers is easily workable in injection molding processes, and therefore the elements in shell form required for the production of boots are easy to produce.

Said mixture of caprolactam polyamide and ionomers may be produced in a single-step process, particularly by mixing caprolactam polyamide and ionomer at a mixing ratio corresponding to the desired rigidity in a compounding extruder, yielding an injection molding granulate.

Ionomers may also be added to caprolactam polyamide in a two-step compounding process, wherein in a first step essentially 5 to 15% by weight are added and in a second step essentially 25 to 50% by weight are added, each with respect to the finished compound material. In this case, in the first process step the ionomers will be distributed particularly finely in the caprolactam polyamide, and this distribution is upheld during the second addition step due to secondary valence bonding forces. The polyamide is first melted in a so-called compounding step, and the additive, i.e. the ionomers are added. Subsequently, solid agglomerates are usually split, then the ionomers are coated with molten polyamide, and subsequently the components of the compound material are distributed evenly. Caprolactam polyamide is usually heated to about 220° to 240° C. for melting.

To compensate for the very different crystallization properties of caprolactam polyamide and the ionomer additive, a crystallization accelerating agent is advantageously added in a further compounding step. This will significantly improve workability in the injection molding process. Moreover, in order to maintain the elastic properties of the compound material as consistent as possible within a wide temperature range, thermoplastic rubber is advantageously added in a further compounding step.

Hereinafter, the invention will be explained in greater detail with reference to preferred embodiments.

DESCRIPTION OF THE INVENTION

Figure 1:
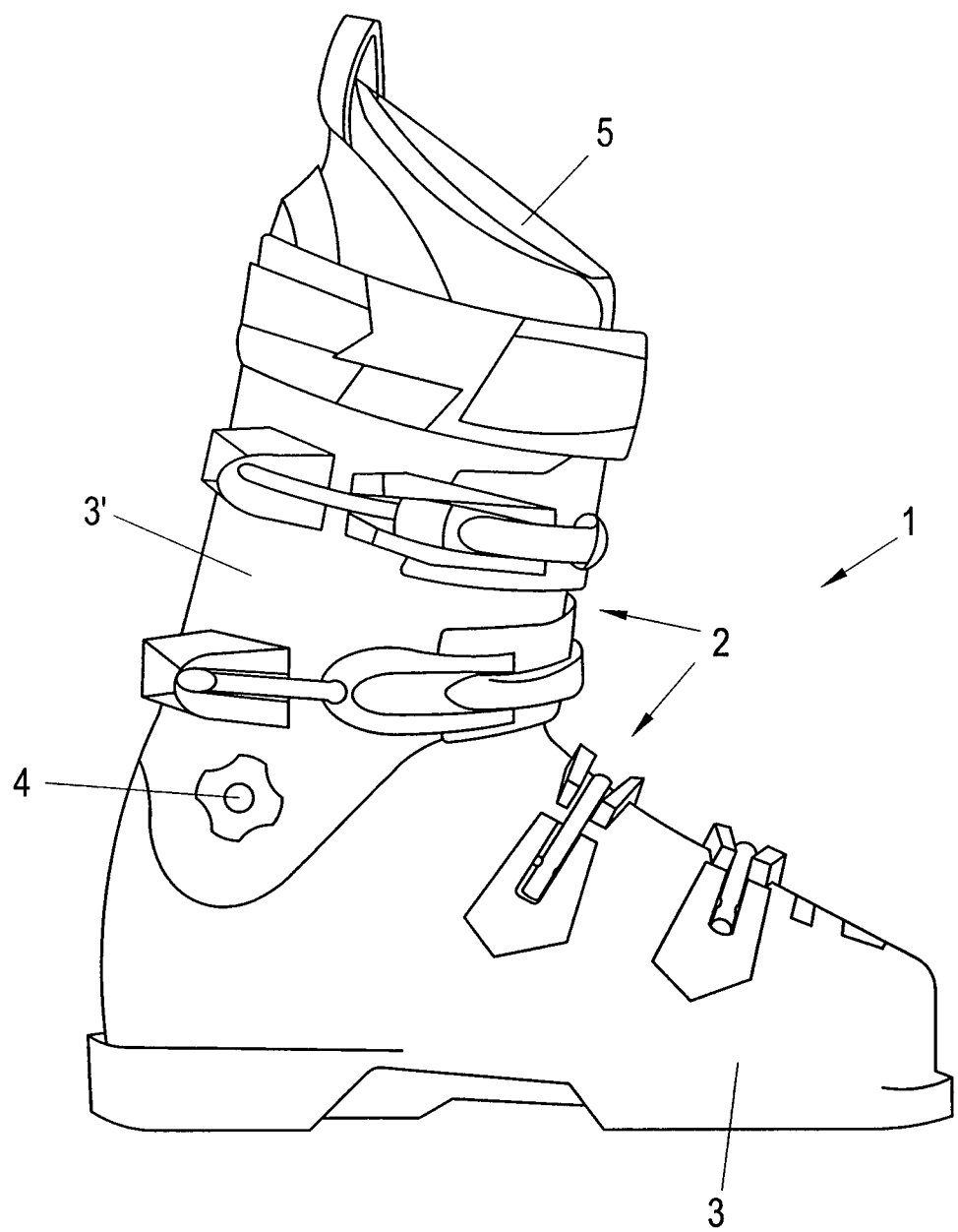
FIG. 1 shows is side view of a hard shell alpine ski boot.

FIG. 1 shows a hard shell alpine ski boot of conventional outside appearance having two elements 2 in shell form, namely a lower shell 3 essentially accommodating the foot, to which a swivel-mounted collar 3' essentially accommodating the lower leg in the shin region is attached via hinge 4. A soft, padded inner boot 5 is provided in both elements 2 in shell form. According to the present invention, said two elements 2 in shell form are made of plastic compound material with caprolactam polyamide (also known as PA 6) as the base material. Ionomers are added to this base material at a weight ratio of 55 to 70%. In addition, a nucleating agent or crystallization accelerating agent comprised of a mixture of talc and low molecular polyamide is added to this plastic compound mixture at a weight ratio of about 0.1 to 1%.

Furthermore, said plastic compound may include about 20 to 30% of thermoplastic rubber to maintain the rigidity factor of elements 2 in shell form at a low level, i.e. preferably between 150 and 200%, in the temperature range of +20° C. to −20° C., which is the relevant temperature range for alpine ski boots. If thermoplastic plastics material is added to the compound plastics material, the ionomer ratio will be correspondingly lower.

Making elements 2 in shell form of such a plastic compound material gives the additional advantage that said elements 2 in shell form may be adapted to the user's foot and lower leg while the user's foot and leg are in the boot, because the softening temperature of the plastic compound material according to the present invention is below 100° C., preferably about 80° C. Consequently, said elements 2 in shell form may be heated up to their softening temperature while the user is wearing the boot with the inner boot 5 between the shell and the foot or leg. Thus, said elements 2 in shell form may be individually adapted to the user's foot and lower leg.

Figure 2:
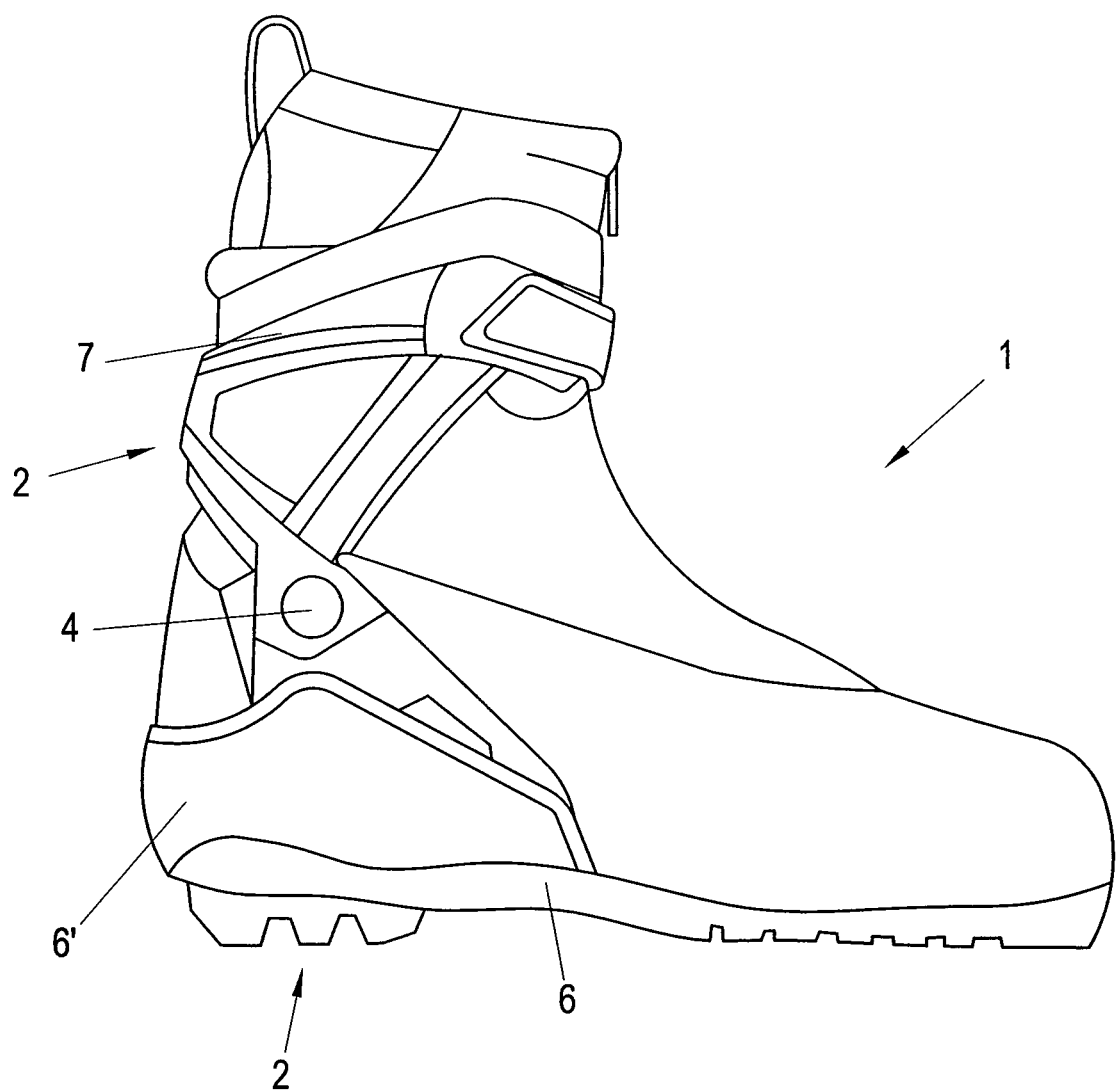
FIG. 2 shows a side view of a cross-country ski boot.

The same applies to essentially all elements 2 in shell form of a cross-country ski boot 1 as shown in FIG. 2. In this case, particularly the sole 6 may be made of the plastic compound material described above. Furthermore, advantageously a heel cap 6' is also made of the material described above and may optionally be formed integrally with sole 6. In addition, a collar 7, which is hinged to lower shell 6' via hinge 4 similar to collar 3', may also be made of the plastic compound material in order to achieve individual adaptation to the user's leg in a simple manner and at the same time ensure consistent rigidity properties as far as possible in the relevant temperature range.

The invention claimed is:

1. A method for producing an element for a ski boot, which comprises the steps of:
   making a compound material by adding ionomers to a caprolactam polyamide, such that cations and anions of the ionomers form ion bonds, the compound material having elastic components forming a physical network that is disruptable between 60° C. and 100° C., so that the element at least partly containing the compound material is thermoformable at a temperature of <100° C.; and
   subsequently forming the compound material in an injection molding process to form the element being part of a ski boot body;
   wherein the element has a varying wall thickness and said compound material at least partly contained therein further comprises at least one crystallization accelerating agent; and
   wherein the method further comprises;
   fitting the element to a foot and/or leg of a user; and
   heating up the element to the temperature while the user is wearing the element for forming the element to a shape of the foot and/or leg.

2. The method according to claim 1, which further comprises:
   adding the ionomers to the caprolactam polyamide in a two-step compounding process, wherein in a first step 5 to 15% by weight are admixed and in a second step 25 to 50% by weight are admixed, each with respect to the compound material.

3. The method according to claim 1, which further comprises adding in the crystallization accelerating agent to the compound material in a further compounding step.

4. The method according claim 1, which further comprises adding in a thermoplastic rubber to the compound material in a further compounding step.

5. A method of adapting ski boots to a user, which comprises the steps of:
   providing a ski boot containing a ski boot body having an element in shell form which at least partly contains a plastic compound material, the plastic compound material containing a mixture of caprolactam polyamide and ionomers, such that cations and anions of the ionomers form ion bonds, the plastic compound material having elastic components forming a physical network that is disruptable between 60° C. and 100° C., so that the element in shell form of the ski boot at least partly containing the plastic compound material is thermoformable at a temperature of <100° C.;
   fitting the element to at least a portion of a foot and/or leg of the user;
   heating up the element to the temperature while the user is wearing the element for forming the element to a shape of the portion; and
   wherein the element has a varying wall thickness and said mixture further comprises at least one crystallization accelerating agent.

6. The method of claim 5, wherein the ski boot is an alpine ski boot.

7. The method of claim 5, wherein said ionomers are copolymerisates of ethylene with carboxylic acid.

8. The method of claim 7, wherein said carboxylic acid is an acrylic acid.

9. The method of claim 5, wherein the mixture comprises at least 20% by weight of said ionomers.

10. The method of claim 5, wherein the at least one crystallization accelerating agent is selected from the group consisting of an organic crystallization accelerating agent and an inorganic crystallization accelerating agent, and wherein the mixture comprises from 0.1 to 1% by weight of the at least one crystallization accelerating agent.

11. The method of claim 5, wherein the at least one crystallization accelerating agent is selected from the group consisting of talc and a low molecular polyamide.

12. The method of claim 5, wherein the at least one crystallization accelerating agent is a mixture of an organic crystallization accelerating agent and an inorganic crystallization accelerating agent, and wherein the mixture comprises from 0.1 to 1% by weight of the at least one crystallization accelerating agent.

13. The method of claim 5, wherein said plastic compound material is a mixture consisting essentially of 30 to 45% by weight of said caprolactam polyamide, from 0.1 to 1% by weight of the crystallization accelerating agent, and a balance of 55 to 70% by weight of said ionomers.

14. The method of claim 5, wherein said plastic compound material further includes a thermoplastic rubber.

15. The method of claim 14, wherein the mixture comprises 10 to 30% by weight of said thermoplastic rubber.

16. The method of claim 14, wherein said thermoplastic rubber is selected from the group consisting of ethylene propylene monomer rubber (EPM) and ethylene propylene diene monomer rubber (EPDM).

17. The method of claim 5, wherein said plastic compound material is a mixture consisting essentially of: 30 to 45% by weight of said caprolactam polyamide, 0.1 to 1% by weight of the crystallization accelerating agent, 20 to 30% by weight of a thermoplastic rubber, and a balance of 25 to 35% by weight of said ionomers.

18. The method of claim 5, wherein said ionomers are copolymerisates of ethylene with carboxylic acid containing metal ions selected from the group consisting of zinc ions and sodium ions.

19. The method of claim 5, wherein the mixture comprises between 25 and 70% by weight of said ionomers.

* * * * *